United States Patent [19]

Smith

[11] 4,191,008
[45] Mar. 4, 1980

[54] APPARATUS FOR HARVESTING OKRA OR THE LIKE

[76] Inventor: Archie O. Smith, 10169 Denton Rd., Jacksonville, Fla. 32226

[21] Appl. No.: 885,164

[22] Filed: Mar. 10, 1978

[51] Int. Cl.² .................................................. A01D 46/00
[52] U.S. Cl. .................................... 56/327 R; 30/129; 30/278; 56/332; 56/338
[58] Field of Search ......... 56/327 R, 327 A, 332–338; 30/113, 129, 278

[56] References Cited

U.S. PATENT DOCUMENTS

| | | | |
|---|---|---|---|
| 1,137,777 | 5/1915 | Moore | 56/327 R |
| 1,176,728 | 3/1916 | Farber | 56/338 |
| 1,816,904 | 8/1931 | Heimroth | 30/129 |
| 2,188,768 | 1/1940 | Demory | 56/327 A |
| 2,417,500 | 3/1947 | Jackson | 56/327 A |
| 2,610,397 | 9/1952 | Sutton | 56/327 A |
| 2,674,083 | 4/1954 | Lezzeni, Sr. | 56/338 |
| 2,707,860 | 5/1955 | Schmidt | 56/327 R |
| 2,748,555 | 6/1956 | Le Cocq | 56/338 |
| 3,114,277 | 12/1963 | Clendenin | 30/113 |
| 3,389,543 | 6/1968 | Clark | 56/337 |

*Primary Examiner*—Jay N. Eskovitz
*Attorney, Agent, or Firm*—Lowe, King, Price & Becker

[57] ABSTRACT

An apparatus for harvesting okra or other fruit or vegetable comprises an elongated frame having a handle at one end thereof and a cutter member at the other end. In order to prevent any contact between the user and irritating pods of the okra, a trigger is provided at the handle for remotely operating the cutter. Also, a shroud partially surrounds the handle to protect the hand of the user during cutting. In one embodiment, the cutter comprises a razor blade located beneath a cylindrical guide member that retains the okra pod in position for cutting of the stem while a pair of stabilizing ears steadies the guide member on a branch of the okra plant. In a second embodiment, a rectangular guide member contains a stem holding bracket that maintains the stem of the okra pod in proper position for cutting by a blade. A set of prongs carried by the blade pierces the pod during a cutting stroke. The pod is automatically released during retraction for disposal into a collection receptacle.

13 Claims, 13 Drawing Figures

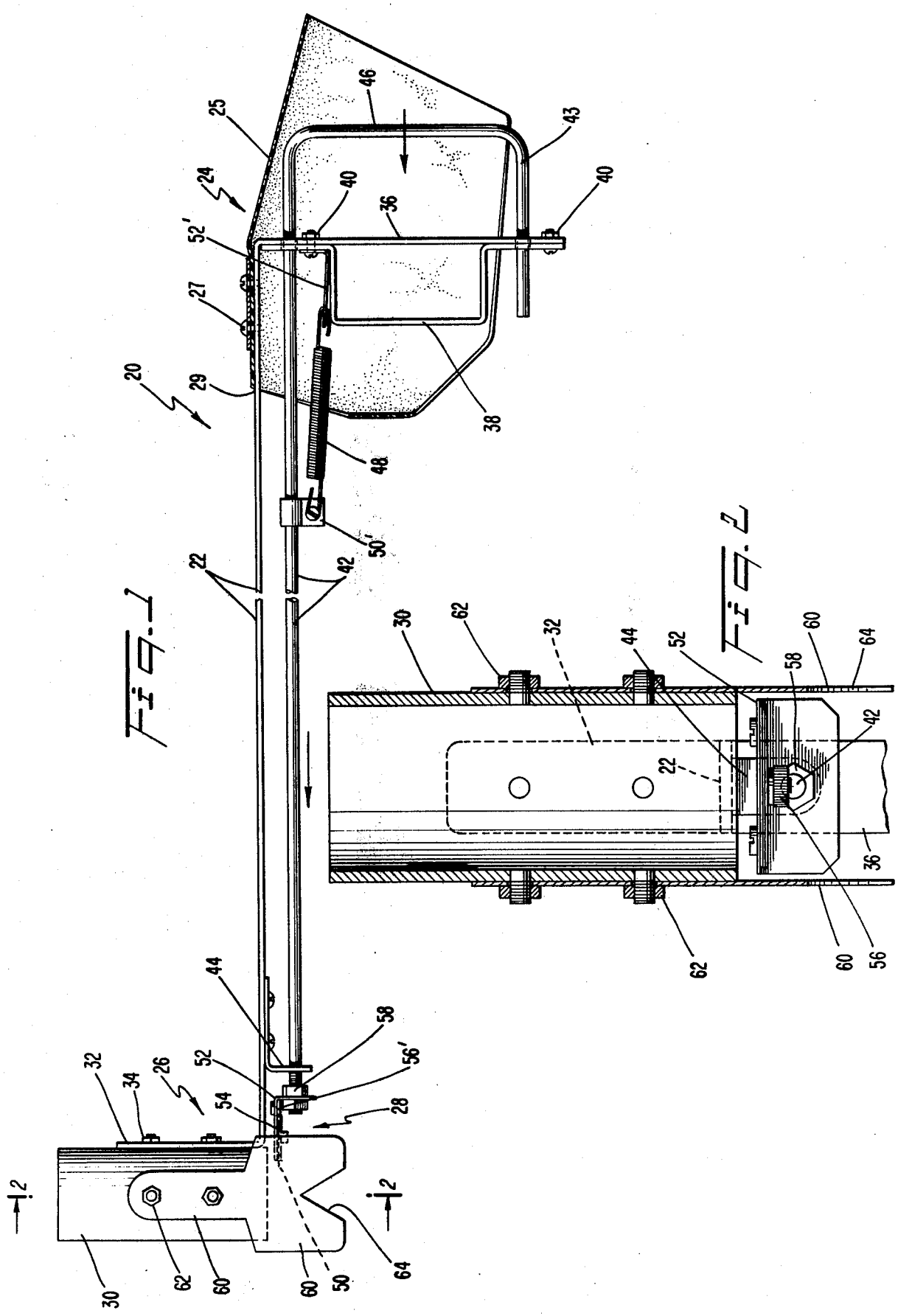

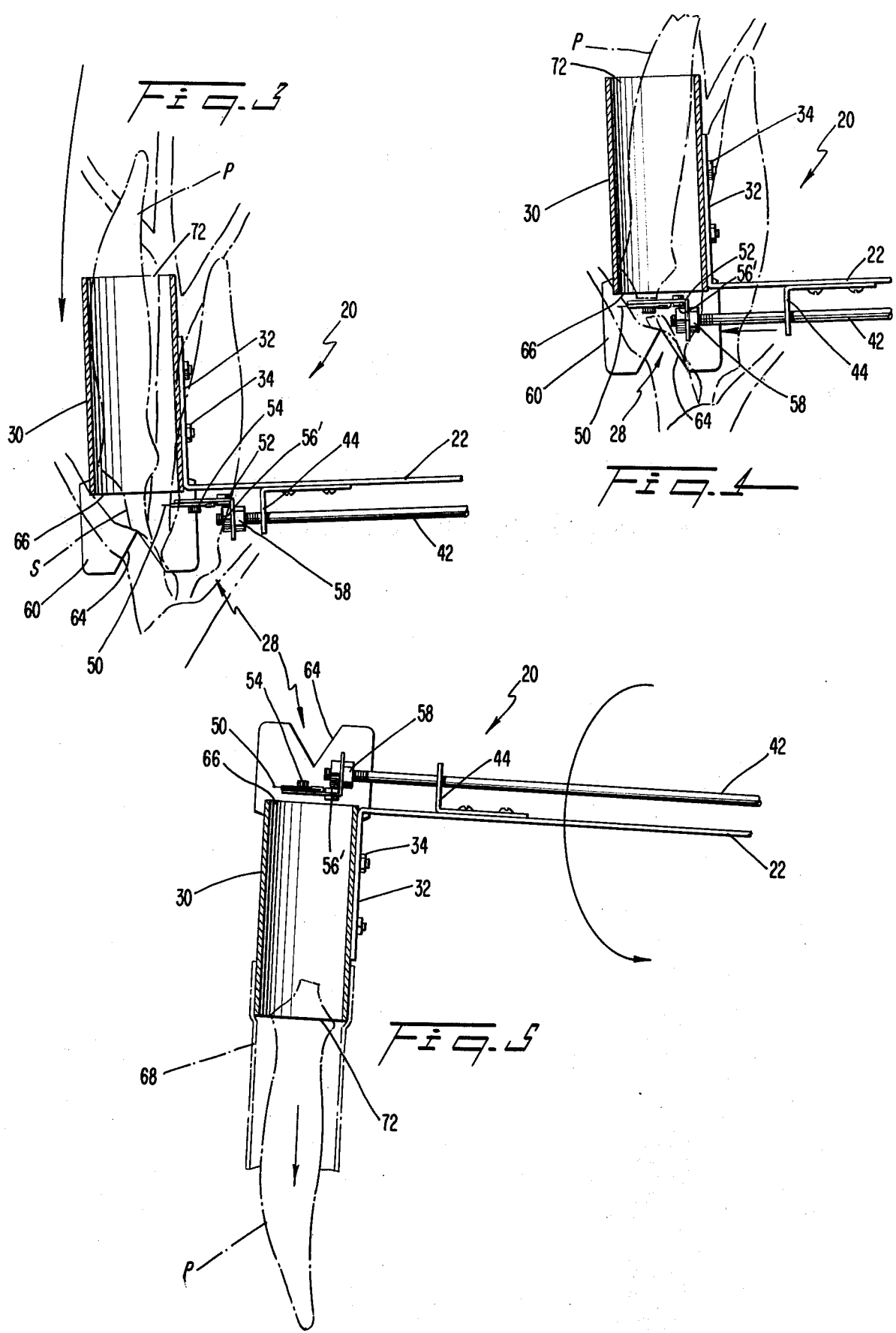

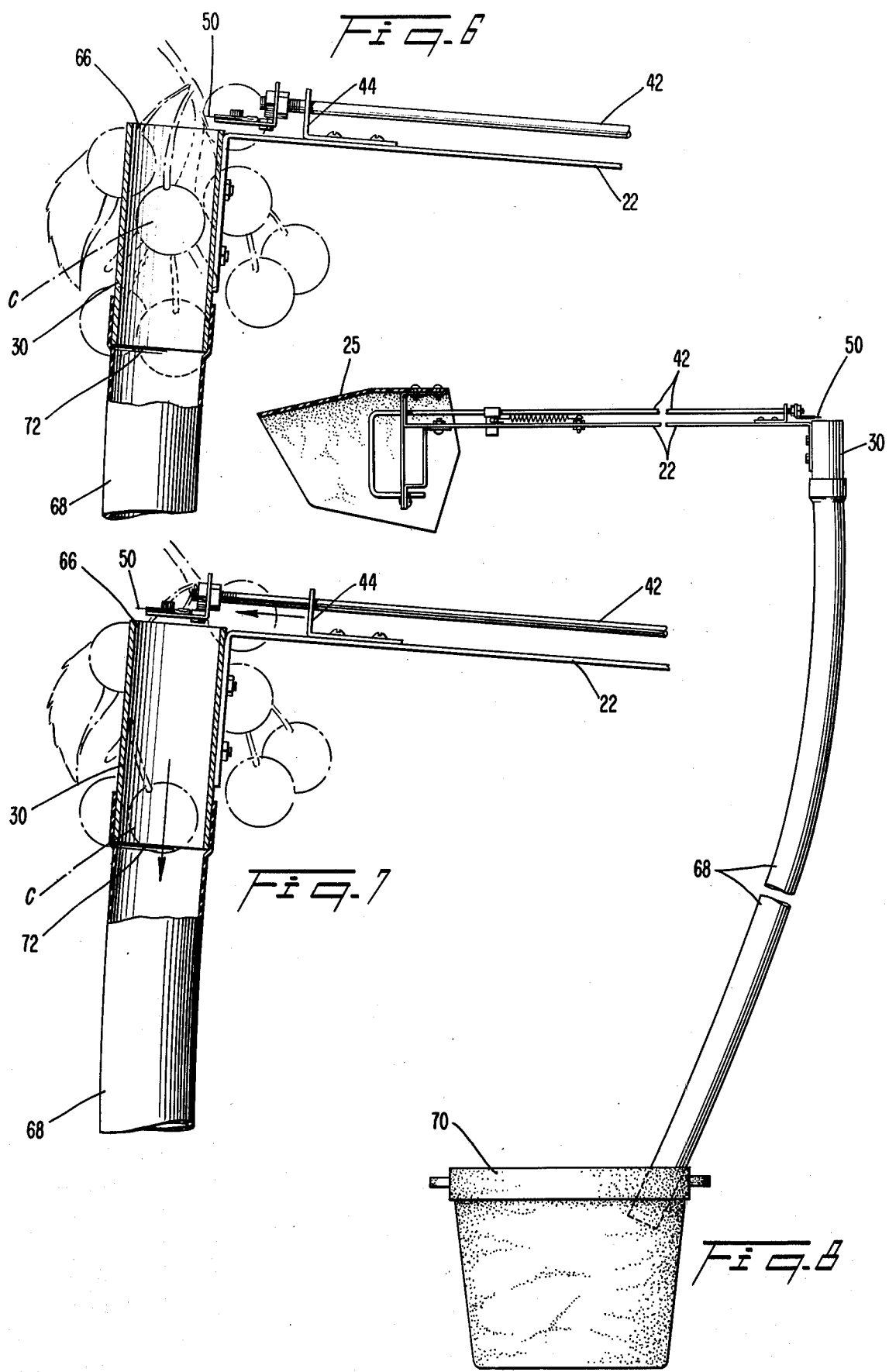

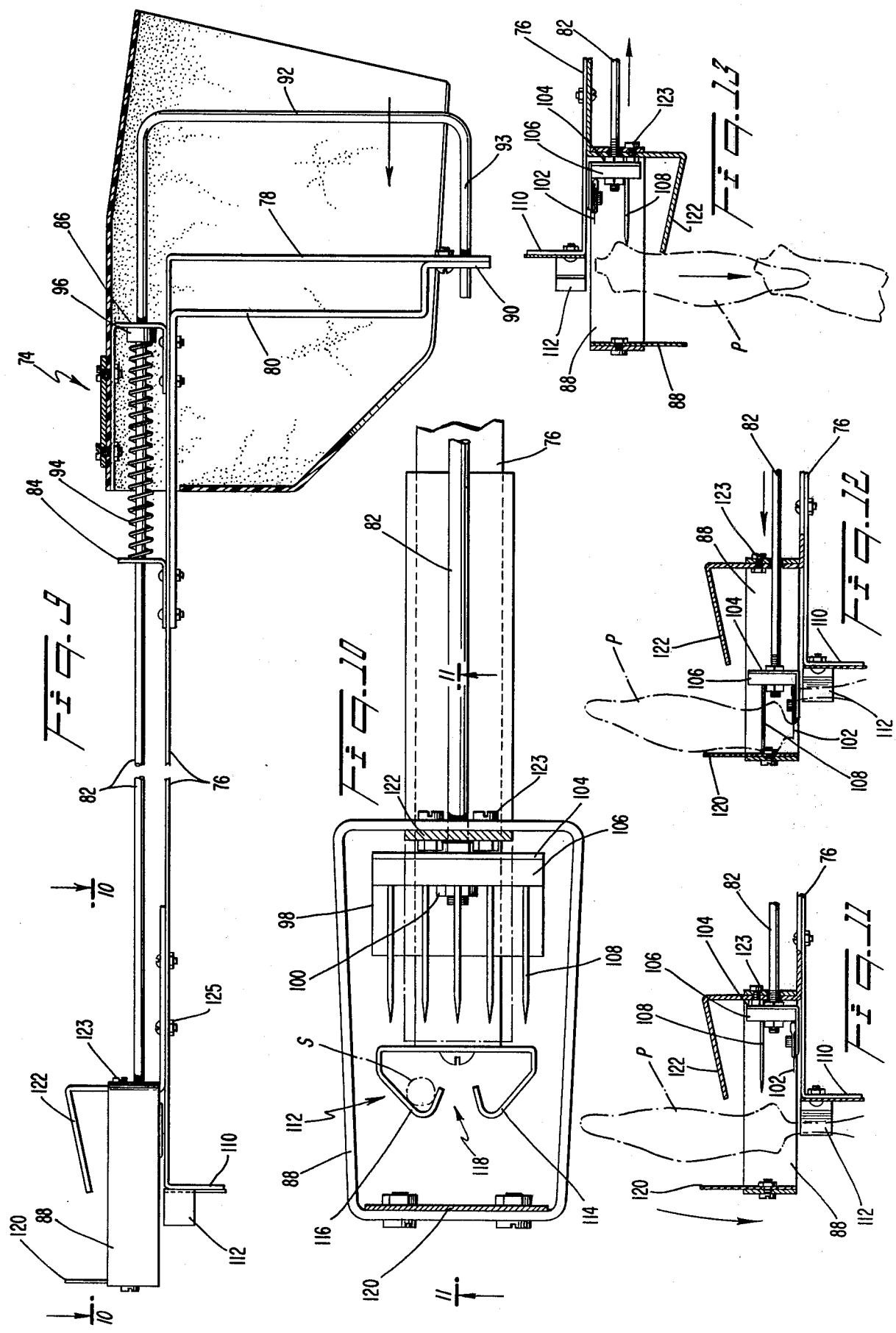

APPARATUS FOR HARVESTING OKRA OR THE LIKE

BACKGROUND OF THE INVENTION

The present invention relates generally to an apparatus for harvesting fruits or vegetables, and more particularly, to an apparatus that prevents any contact between the product and body of the user during cutting of irritating vegetables, such as okra.

In harvesting okra or other irritating vegetable or fruit, physical contact between the pods and body of harvesting personnel must be avoided. With respect to the okra plant, for example, the pod (also known as gumbo) is used as the basis of soups and stews. The pods are difficult to harvest by hand because they tend to secrete mucilage which is very irritating to the skin. Although prior art apparatus using a manually controlled cutter at one end of an extended arm for harvesting fruits or vegetables beyond the reach of an individual have been provided, none to my knowledge has been well suited to the harvesting of okra, or the like, wherein the plant must be separated from the body of the user at all times during cutting of the stem and transferring of the pod to a collection receptacle. The prior art cutting apparatus have also been relatively heavy, bulky, and inconvenient. Also, the prior art apparatus has tended to use several interconnected moving parts that both increase costs and decrease reliability.

Accordingly, one object of the invention is to provide a new and improved harvesting apparatus that is especially suited for harvesting the okra pod or other irritating vegetable or fruit.

Another object is to provide a new and improved harvesting apparatus, wherein the fruit or vegetable being harvested is maintained out of contact with the body of the user at all times.

Another object of the invention is to provide a new and improved harvesting device wherein the fruit or vegetable being harvested is retained within a guide member for cutting and transfer to a collection receptacle in a single operation while being at all times maintained out of contact with the body of the user.

SUMMARY OF THE INVENTION

A harvesting apparatus for cutting and transferring an okra pod, or other fruit or vegetable, comprises an elongated frame member having a handle formed at one end thereof and a guide member for receiving the pod at the other end. A cutter blade is positioned beneath the guide member and supported to the frame for transverse movement with respect to the guide under the control of a trigger at the handle. The length of the frame member is large enough to avoid any contact between the pods being harvested and the body of the user. A shroud is provided around the handle to protect the hand of the user from surrounding okra pods on nearby branches.

In accordance with one embodiment of the invention, the guide member comprises a cylinder having a center axis perpendicular to the frame member with the cutter blade positioned beneath the cylinder mouth. The cutter blade is coupled to the handle by a rod that is supported to the frame member by a set of brackets. The cutter blade is preferably a standard razor blade that is mounted on a support bracket attached to the coupler rod. The cutter blade is spring biased into a retracted position wherein the blade is positioned beyond the wall of the cylinder with the cutting edge closely adjacent a portion of the wall. In the extended, cutting position, the cutter blade is positioned adjacent the diametrically opposed portion of the cylinder wall. Thus, during a cutting stroke, the blade sweeps across the mouth of the cylindrical guide member to cut the stem of an okra pod positioned within the guide. A pair of stabilizing ears are attached to the outer wall of the cylindrical guide member to enable the guide to be positioned on a branch of an okra plant while cutting a pod. A hose may be provided between the cylindrical guide member and a collection receptacle for automatically transferring the pod to the receptacle after each cut.

In accordance with a second embodiment of the invention, the guide member has a generally rectangular wall defining an opening for receiving the pod to be harvested. A cutter blade (preferably a razor blade) is positioned on a mounting bracket beneath the mouth of the guide. Beneath the blade, a stationary, stem holding bracket is provided for maintaining the stem in proper position for cutting while the pod is retained within the rectangular guide member. The stem holding bracket includes right and left, arcuate holding portions defining a central channel to receive the stem to be severed. A plate member is attached to one side of the guide member for maintaining a pod in a vertical orientation within the guide during cutting. A set of prongs attached to the blade mounting bracket moves together with the blade during the cutting strokes. The prongs extend beyond the cutting edge of the blade for piercing the okra pod within the guide member prior to cutting of the stem. The pod is thus retained within the guide by the prongs following stem cutting to enable the pod to be manually transferred to the collection receptacle prior to release. A pod release bracket is connected to the guide member and extends toward the stem holding bracket to automatically release the pod from the set of prongs during retraction of the cutter blade.

Still other objects and advantages of the present invention will become readily apparent to those skilled in this art from the following detailed description, wherein I have shown and described only the preferred embodiments of the invention, simply by way of illustration of the best modes contemplated by me of carrying out my invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF THE DRAWING

FIG. 1 is a side view of the harvesting apparatus, in accordance with one embodiment of the invention;

FIG. 2 is a cross sectional end view, taken along the line 2—2 in FIG. 1, showing the cylindrical guide member and cutter blade;

FIGS. 3, 4 and 5 show a sequence of operation using the apparatus of FIG. 1 to harvest okra;

FIGS. 6 and 7 show a sequence of operation using the apparatus of FIG. 1 to harvest cherries;

FIG. 8 shows the harvesting apparatus of FIG. 1 in combination with a hose for transferring the harvested product to a collection receptacle;

FIG. 9 is a side view of a harvesting apparatus in accordance with a second embodiment of the invention;

FIG. 10 is a top view of one portion of the apparatus viewed along the line 10—10 in FIG. 9; and FIGS. 11–13 show a sequence of operating the apparatus of FIG. 9 to harvest okra.

DETAILED DESCRIPTION OF THE PREFERRED EMBODIMENTS

Referring to FIGS. 1 and 2, in accordance with a first embodiment of the invention a harvesting apparatus, designated generally by the numeral 20, comprises a frame member 22 having a first end 24 defining a handle and an opposite end 26 attached to a cutting member 28 and a cylindrical guide member 30. The frame 22 is preferrably formed to flat aluminum stock (see FIG. 2) having an upturned part 32 attached to the cylindrical guide member 30 with fasteners 34. At the opposite end of frame 22, a downturned part 36 is adapted to receive the fingers of the user and is operative as a trigger for controlling cutter 28; a U-shaped bracket 38 being secured to the downturned part 36 by fasteners 40 to form a region for receiving the fingers. A shroud 25, attached to the frame member 22 at fasteners 27, partially surrounds the bracket 38 and frame part 36 to protect the hand of the user from contact with the product being harvested or with surrounding shrubbery. The shroud contains an opening 29 formed therein into which frame member as well as rod 42 and spring 48 extends.

One end of rod 42 is supported beneath the frame 22 by angle bracket 44 and the opposite end is supported by members 36 and 38, as shown in FIG. 1. The rod 42 wraps around the downturned portion 36 of the frame 22 forming a U-shape. The lower portion 43 of the rod 42 is supported within an aperture formed in members 36 and 38 just above lower fastener 40. The rear part 46 of the rod 42 is thus adapted to receive the palm of the user's hand as the fingers are located between members 36 and 38 to cause forward movement of the rear part 46, or trigger, in the direction of the arrow as shown in FIG. 1. During forward movement of trigger 46, rod 42 is also moved in the direction of the arrow causing the cutter 28 to shift from a retracted position (FIG. 1 and FIG. 3) to an extended position (FIG. 4), described below. The cutter 28 is normally retained in the retracted position by spring 48 connected between a first bracket 50' secured to rod 42 and a second bracket 52' secured to downturned portion 36 of the frame 22.

Still referring to FIG. 1, cutter member 28 comprises a standard razer blade 50 located on a razor blade mounting bracket 52 (angle bracket) by a screw 54 that extends through the bracket 52 and blade 50 and receives a twist nut 56 (see FIG. 2). Tightening of nut 56 on the screw 54 secures the blade and bracket together, the alignment of the blade being maintained by an alignment tab 56'. The mounting bracket 52 is mounted on the end of rod 42 by a pair of adjustment nuts 58 that permit the axial position of the blade 50 to be adjusted on the rod.

A pair of stabilizing ears 60 are attached to opposite wall portions of cylindrical guide member 30 by fasteners 62, as shown in FIG. 2. Each of the ears 60 has a V-notch 64 formed therein to receive a branch of the okra plant during cutting of a pod stem for stability during cutting.

Referring now to FIGS. 3 and 5, the operation of the apparatus shown in FIGS. 1 and 2 in connection with the cutting of an okra pod shall be described. In FIG. 3, the apparatus 20 is positioned over an okra pod P with the mouth 66 of the cylindrical guide 30 being located adjacent the stem S of the pod to be cut. In the retracted position, the blade 50 of the cutter 28 is located beneath the mouth 66 of the guide 30 and just adjacent the guide wall. Of particular importance, the entire blade is located outside the guide 30 in the retracted blade position to enable the guide to be located around the pod P without obstruction by the cutter 28. The guide 30 is stabilized in place on the plant with notches 64 of ears 60 located on or at the branch from which pod P is extending. The trigger 46 of apparatus 20 is now operated by squeezing with the palm as explained in connection with FIG. 1 to initiate a cutting stroke. The cutter 28 is thrust forward to cause a diametrical sweep across the mouth 66 of cylindrical guide member 30 to sever the stem S, as shown in FIG. 4. The pod P, now released from the branch, is confined within the wall of cylindrical guide 30.

The apparatus 20 is finally inverted, as shown in FIG. 5, to cause the pod P to drop under the force of gravity to a collection receptacle, such as 70 in FIG. 8. An optional hose 68 may be attached to the end of guide 30 opposite the mouth 66 to automatically direct the pod to the receptacle 70.

Referring to FIGS. 6 and 7, the operating sequence of apparatus 20 may be modified to harvest hanging fruits or vegetables, such as cherries, as shown, wherein the apparatus is operated in an inverted orientation. Referring to FIG. 6, the mouth 66 of the guide 30 is positioned upwardly to receive a cherry C. End 72 of the guide 30 is oriented downwardly within collection hose 68. When the cutter 28 is operated in a cutting stroke by squeezing trigger 46 (FIG. 1), the stem of cherry C is severed causing the cherry to fall downwardly within hose 68 under the force of gravity to the collection receptacle 70 (see FIGS. 7 and 8).

Referring now to FIGS. 9 and 10, in accordance with a second embodiment of the invention, a harvesting apparatus, identified generally by the numeral 74, comprises a stationary frame member 76 having a downturned portion 78 and angle bracket 80 connected together to form an opening for receiving the fingers of the operator's hand, in a manner similar to the embodiment of FIG. 1, together with a rod 82 supported above the frame by brackets 84 and 86 as well as by the wall of a guide member 88. The rear portion 92 of rod 82 is wrapped around member 78 and 80 in a generally U-shape with the lower portion 93 of the rod being located within apertures 90 formed in members 78 and 80. The rear-most part 92 of rod 82 is thus a trigger which contacts the palm of the user's hand to enable squeezing of the portion 92 together with members 78, 80 during a cutting stroke. Shroud 93 partially surrounds the hand of the operator for protection. The rod 82 is maintained in the normally retracted position, as shown in FIG. 9 (see also FIG. 11) by a spring 94 which is in abutment at one end with bracket 84 and is secured at the other end to rod 82 by collar 96.

Referring to FIG. 10, the forward or working end of rod 82, extending through the wall of guide member 88, is attached to a blade mounting bracket 98. The mounting bracket 98 is axially adjustable using adjustment nuts 100, and a conventional razor blade 102 (FIG. 11) is removably mounted to the bracket.

Guide member 88 is defined by a generally rectangular wall and has dimensions large enough to receive the okra pod P, as shown in FIG. 11, or any other product to be harvested. The guide 88 is secured to angle bracket 122 by fasteners 123, the bracket in turn being secured to frame 76 by fasteners 125.

The blade mounting bracket 98 comprises an angle bracket having an upstanding wall portion 104. Attached to the wall portion 104 is a block 106 to which is welded a set of prongs 108 that forwardly extend just beyond the cutting edge of blade 102 (see FIG. 11). The prongs 108 reciprocate parallel to frame member 76 together with blade within guide member 88 during a cutting stroke.

The forward end of the frame 76 has a downwardly extending portion 110 (FIG. 9) that is attached to a stem holding bracket 112. Bracket 112 is stationarily positioned between the blade 102 in the retracted (FIG. 11) and extended, cutting (FIG. 12) positions.

Referring to FIG. 10, the bracket 112 is formed with opposite, arcuate portions 114 and 116 defining a channel 118 therebetween. The channel is open to receive the stem S of an okra pod for positioning within the right or left arcuate portions 114, 116 thereof, as shown. The arcuate portions 114, 116 maintain the stem S stationary in a substantially vertical direction during cutting, as shown in FIG. 10, by blade 102. The provision of adjacent portions 114, 116 enables the operator to secure the okra stem with either right hand or left hand movements of the guide following initial positioning of the okra pod within the guide wall 88. An upstanding plate 120 is secured to one end of rectangular guide member 88 to support and help vertically orient the okra pod P during the cutting stroke, as shown in FIG. 12.

During the positive cutting stroke, as shown in FIGS. 11 and 12, the trigger portion 92 of rod 82 is squeezed by the palm of the user's hand to move the cutter blade 102 toward the okra stem for cutting. This action also compresses spring 94 tending to urge the blade 102 in the retraction direction. Just prior to cutting of the stem by blade 102, prongs 108 pierce the okra pod, as shown in FIG. 12, and press the pod P against plate 120 as the stem is severed.

The angle bracket 122 attached to the side of guide member 88 extends into the guide just beyond the extent of the prongs in the retracted position, as shown in FIG. 11. During the retraction assisted by spring 94, the bracket 122 slips the pod P off prongs 108 (FIG. 13) enabling the pod to be deposited in a collection receptacle (not shown).

In this disclosure, there is shown and described only the preferred embodiments of the invention, but, as aforementioned, it is to be understood that the invention is capable of use in various other combinations and environments and is capable of changes or modifications within the scope of the invention concept as expressed herein.

What is claimed is:

1. A fruit harvesting apparatus, comprising
an elongated frame member, one end of said frame member forming a handle;
a cylindrical guide member for receiving fruit to be harvested, said guide member being attached to the opposite end of said frame member and having an axis perpendicular to said frame member;
a cutter blade positioned adjacent a lower end of said guide member;
means for supporting said cutter blade to said frame member for longitudinal movement relative to said cylindrical guide member;
trigger means located at said handle for reciprocating said cutter blade between (1) a retracted position wherein a cutting edge of said blade is positioned adjacent a wall portion of said cylindrical guide member and (2) an extended, cutting position wherein the cutting edge is positioned adjacent a diametrically opposed wall portion of said cylindrical guide member;
spring means for biasing said cutter blade in the retracted position; and
stabilizing means attached to and extending below said cylindrical guide member, said stabilizing means adapted for contacting a branch beneath a fruit being cut by said cutter blade.

2. The harvesting apparatus of claim 1, wherein the axis of said cylindrical guide member and said handle are parallel to each other.

3. The harvesting apparatus of claim 2, wherein said trigger means includes rod means parallel to said frame member for providing coupling beween said handle and said cutter blade, said supporting means including bracket means for supporting said rod means to said frame member.

4. The harvesting apparatus of claim 1, wherein said stabilizing means includes a pair of stabilizing ears attached to opposite wall portions of said cylindrical guide member, each of said ears containing a V-shaped notch for receiving the branch.

5. The harvesting apparatus of claim 1, including shield means partially surrounding said handle for protecting the hand of a user during cutting.

6. The harvesting apparatus of claim 3, wherein said cutter blade includes a razor blade, and further wherein one end of said rod is attached to a razor blade mounting bracket, and means for releasably securing said razor blade to the bracket.

7. The harvesting apparatus of claim 1, including a hose attached to said cylindrical guide member for transferring fruit cut by said cutter blade to a collection receptacle.

8. A fruit harvesting apparatus, comprising
an elongated frame member, one end of said frame member forming a handle;
a guide member attached to the opposite end of said frame member, said guide member having a wall defining an opening for receiving fruit, the center axis of said opening being perpendicular to said frame member;
a cutter blade located within said guide member;
means for supporting said cutter blade to said frame member for longitudinal movement between a retracted position and an extended, cutting position;
stem holding means positioned within said guide member intermediate the retracted and extended positions of said cutter member for holding the stem of a fruit positioned within the guide member for cutting;
trigger means located at said handle for reciprocating said cutter blade between the retracted and extended positions;
spring means for biasing said cutter blade in the retracted position; and
a set of prongs carried by said cutter blade supporting means, said prongs extending beyond the blade for piercing a pod located within the guide member prior to cutting of the pod stem.

9. A fruit harvesting apparatus, comprising an elongated frame member, one end of said frame member forming a handle;

a guide member attached to the opposite end of said frame member, said guide member having a wall defining an opening for receiving fruit, the center axis of said opening being perpendicular to said frame member;

a cutter blade located within said guide member;

a set of prongs carried by said cutter blade supporting means, said prongs extending beyond the blade for piercing a pod located within the guide member prior to cutting of the pod stem;

means for supporting said cutter blade to said frame member for longitudinal movement between a retracted position and an extended, cutting position;

stem holding means positioned within said guide member intermediate the retracted and extended positions of said cutter member and having a stem contacting portion opposed to said cutter blade for holding the stem of a fruit positioned within the guide member and preventing longitudinal movement of the stem by the blade during cutting by longitudinal movement of said cutter blade;

trigger means located at said handle for reciprocating said cutter blade between the retracted and extended positions; and spring means for biasing said cutter blade in the retracted position.

10. The harvesting apparatus of claim 9, including a stationary release member attached to said guide member and extending toward said stem holding means for releasing the pod from said prongs during a retraction of said cutter member.

11. The harvesting apparatus of claim 10, wherein said release member includes a bracket extending into said guide member between the extended and retracted positions of said cutter blade.

12. The harvesting apparatus of claim 10, including a plate member attached to one side of said guide member for maintaining the pod in a vertical orientation within said guide member during cutting.

13. The harvesting apparatus of claim 10, wherein said stem holding means includes right and left, arcuate holding members secured to said frame member, a channel being formed between said holding members to permit ingress of a stem to be severed.

* * * * *